(12) United States Patent
Janik et al.

(10) Patent No.: US 7,412,896 B2
(45) Date of Patent: *Aug. 19, 2008

(54) FILTER CHANGE INDICATOR

(75) Inventors: Leon P. Janik, Suffield, CT (US);
Stephen J. Vardion, Glastonbury, CT (US); Michael J. Williams, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/601,307

(22) Filed: Nov. 17, 2006

(65) Prior Publication Data

US 2007/0125179 A1 Jun. 7, 2007

Related U.S. Application Data

(63) Continuation-in-part of application No. 10/930,970, filed on Aug. 31, 2004, now Pat. No. 7,137,303.

(51) Int. Cl.
*H01L 21/00* (2006.01)

(52) U.S. Cl. ............................. 73/753; 257/302; 73/723
(58) Field of Classification Search ................... 73/744, 73/723, 753; 210/90, 94; 116/268; 257/302
See application file for complete search history.

(56) References Cited

U.S. PATENT DOCUMENTS

| | | |
|---|---|---|
| 3,532,069 A | 10/1970 | Moon, Jr. |
| 4,153,003 A | 5/1979 | Willis |
| 4,272,368 A | 6/1981 | Foord et al. |
| 4,366,717 A | 1/1983 | Foord et al. |
| 4,654,643 A | 3/1987 | Meisenheimer, Jr. |
| 4,818,385 A | 4/1989 | Medley, III |
| 6,190,442 B1 | 2/2001 | Redner |
| 2004/0113803 A1 | 6/2004 | Keown |

*Primary Examiner*—Andre J Allen
(74) *Attorney, Agent, or Firm*—Alix, Yale & Ristas, LLP

(57) ABSTRACT

A fluid system pressure indicator is adapted for use in fluid systems having a filter element. The fluid system force indicator includes a housing partitioned to be exposed to the fluid system to provide transmission of a mechanical force between these partitioned environments to indicate the fluid pressure. This exterior shape change is such that it can be identified through tactile means not requiring visual identification.

20 Claims, 13 Drawing Sheets

FILTER CHANGE INDICATOR

CROSS REFERENCE TO RELATED APPLICATIONS

This application is a continuation in part of U.S. application Ser. No. 10/930,970 filed on Aug. 31, 2004, now U.S. Pat. No. 7,137,303 the disclosure of which is incorporated herein by reference in its entirety.

TECHNICAL FIELD

The present disclosure relates to fluid systems having a filtration device in which restriction of the filtration device can be determined by measurement of pressure. More specifically, the disclosure relates to devices for indicating whether a fluid filter is effective and/or requires replacement.

BACKGROUND

Fluid systems requiring filtration apparatus are an integral part of the automotive and heavy equipment industries. Engine systems, hydraulic systems and various other collateral systems require fluids such as air, oil, fuel and coolants to be at least partially contained and directed to their functional end points.

For instance, in engine systems utilizing diesel as fuel, extremely high pressure pumps are utilized. These pumps have very close tolerances and may be easily damaged or disabled if particulate laden fuel is passed through them. In addition, the fuel injectors of these engines are configured to deliver a spray of fuel in a specifically designed pattern. Interference with the passages, orifices or other structures of the injectors may result in a decrease in engine efficiency and/or damage to the engine itself. As such, many diesel fuel systems require at least one filter to be present between the fuel storage compartment and the high pressure pump.

Depending on such things as preventative maintenance scheduling, fuel quality, operating conditions, and the like, fuel filters become restricted or clogged at various rates. Filter occlusion may adversely impact engine efficiency, and in some cases, may damage or destroy components of the engine. In other cases, restriction of the filter can result in filter failure which may allow highly contaminated fluid to reach portions of the pump or injector system, resulting in extremely high repair costs for those devices.

Typically, the status of a filter, be it a gas or liquid filter, is determined through use of a pressure gauge, which is incorporated between the filter and a pump. As the filter becomes occluded with particles, the pump must maintain a higher pressure differential across the filter to maintain the same level of fluid flow required for proper engine function. As this pressure differential increases, the conventional filter monitor moves an indicator contained within a housing. The position of the indicator can be viewed through a sight window and the percent of filter occlusion can typically be determined by marks located on the gauge housing relative to the indicator within the gauge housing.

A wide variety of filter monitors or indicators exist conventionally. Some of the conventional devices utilize colors as indicators. These monitors fall into two general categories of gauges that are observed while the engine is running, and 2 gauges which maintain statically a reading of the highest differential pressure encountered during engine operation. These conventional devices have several drawbacks. They often must be cleaned of material build-up covering the sight window or be otherwise manipulated so as to allow visualization through the sight window in order to accurately determine the level of filter occlusion.

The direct visional observation requirement means that the device has to be located such that it can be viewed during pre-startup and/or post-running maintenance. As is well known in the relevant arts, the normal operation of equipment and associated fluid systems results in a buildup of material on equipment components that is often composed of oils and other fluids mixed with dust, dirt and particulates. Accordingly, the sight window of conventional pressure monitors often becomes sufficiently covered with the dust, grime, grease or other material so that the indicator is no longer visible. The inability to readily observe the indicator markings may lead to the filter check step of normal maintenance being eliminated, thus resulting in severe damage to the equipment during operation.

In addition, the principal composite materials of these conventional devices are limited to transparent plastic or glass material. In particular, the plastic materials may be damaged by heat and/or abrasion to the point that visibility through the material is significantly degraded or no longer achievable.

Several conventional filter monitoring devices utilize electronic means for the detection of pressure differentials. These devices require that the detector be energized and typically employ pressure transducers. In some instances, these electronic devices are not as dependable as mechanical indicators since a failure of the pressure transducer may occur without warning, thereby allowing an engine to be run with a heavily occluded filter, which can result in engine and/or injection system damage.

Another problem associated with detecting pressure differentials is the susceptibility to false indications caused by transient pressure pulses. Pressure spikes are commonly generated from the throttle changes and cold fuel conditions.

SUMMARY

Briefly stated, one preferred form is generally directed toward a fluid system pressure indicator for use in fluid systems having a pump and a filter element. The fluid system pressure indicator includes a housing providing a space in which fluid pressure of the fluid system can be monitored and a pressure communicator to provide a transmission of pressure from the monitored space to an electrical indicator element. The transmission of pressure causes the filter change indicator to initiate an electrical signal when a greater than normal pressure differential across the filter is encountered. The presence or absence of the electrical signal can be monitored through such things as gauges, lights, and/or sound generating means remote from the filter change indicator.

DETAILED DESCRIPTION

Figure 1:
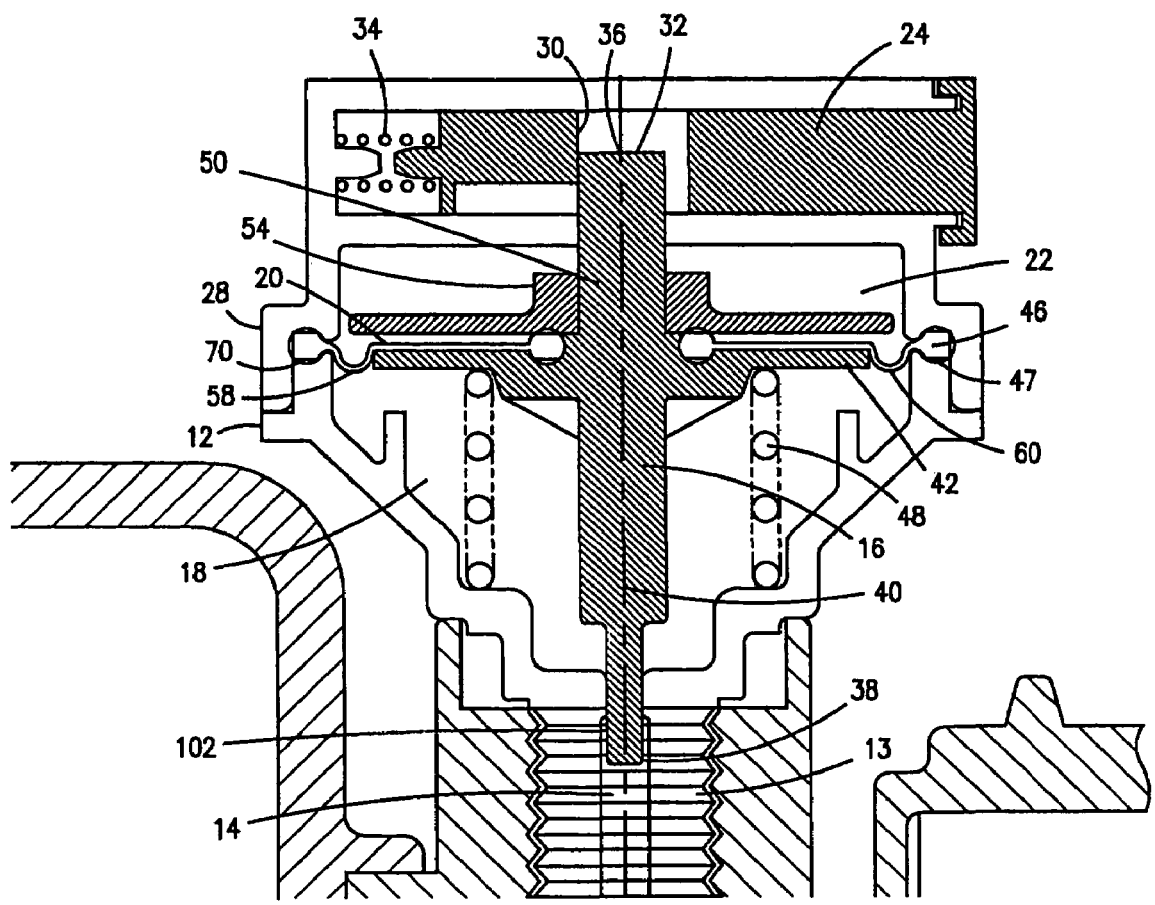
FIG. 1 is a cut-away view of a filter change indicator.

With reference to the drawings wherein like numerals represent like parts throughout the several figures, a filter change indicator is generally designated by the numeral 10. The filter change indicator 10 is preferably incorporated into a filter system to provide a tactile indication of the filter condition to aid in the determination as to whether the filter requires replacement. The filter change indicator 10 has an efficient and low cost construction and is, for example, constructed from combinations of low cost materials such as plastic, metal, ceramic or other materials. For example, the principal material may be molded ABS plastic.

The filter change indicator 10 includes a graduated multi step housing 12, which partially forms a containment vessel or fluid portion 18. The exterior of the housing is preferably configured to be integrated into a fluid line, plenum or housing through such features as a threaded plug portion 13. The housing 12 has, for example, a fluid passage 14 extending from the interior of the fluid system, into the interior portion of the housing 12. Within the housing 12 is a pressure communicator 16, which at least partially interacts with the fluid in the fluid system. The pressure communicator 16 has a portion designed to maintain fluid contact and a portion which is to be isolated from the fluid. The interior of the housing 12 is divided into a fluid portion 18, which is in fluid communication with the fluid system of interest, and a non-fluid portion 22. This partitioning is achieved with a fluid diaphragm 20, which can be associated with the pressure communicator 16. The fluid diaphragm 20 is made of a membrane material such as metal, rubber, rubber-coated woven material, plastic, silicones, fluorosilicones, and/or other polymeric material, having varying degrees of flexibility. The fluid diaphragm 20 acts as a sealing element between the fluid portion 18 and the non-fluid portion 22 of the housing 12, and may also act as a flexible element to allow for the pressure communicator 16 to be axially displaceable.

Figure 4:
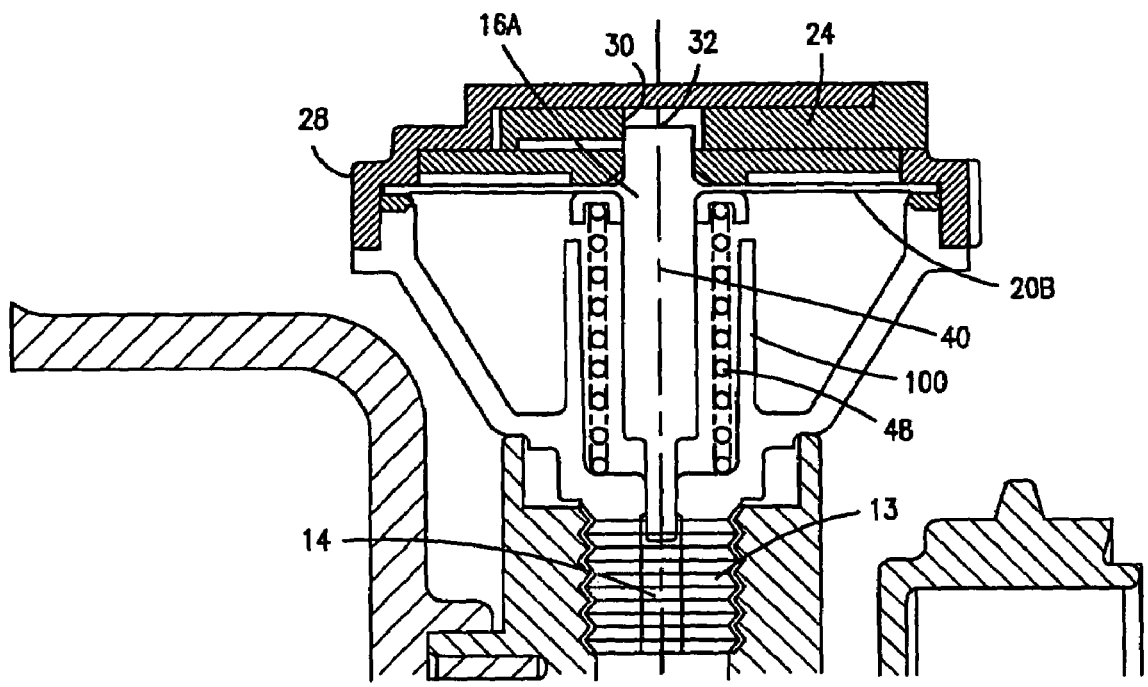
FIG. 4 is a cut-away view of a filter change indicator having a one-piece pressure communicator and diaphragm.
Figure 9A:
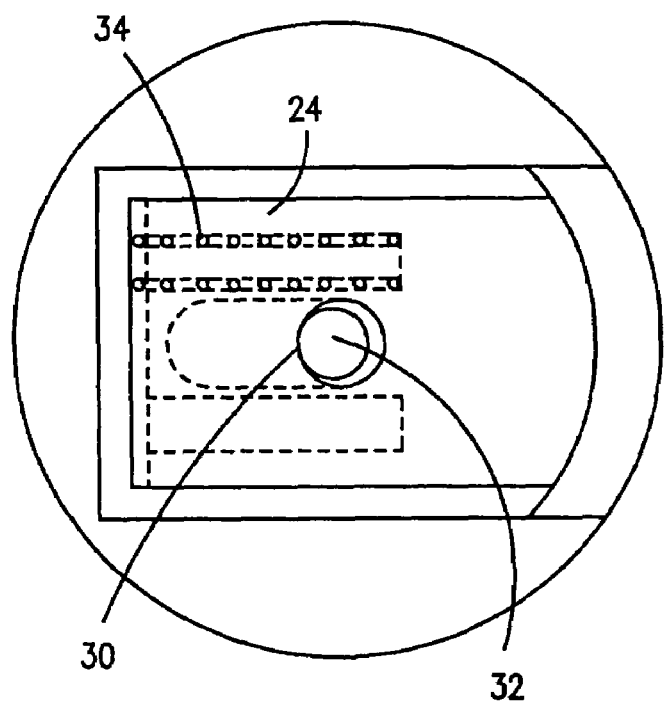
FIGS. 9A and 9B are a top plan view, partially in phantom, and a cut away view respectively of a filter change indicator.
Figure 9B:
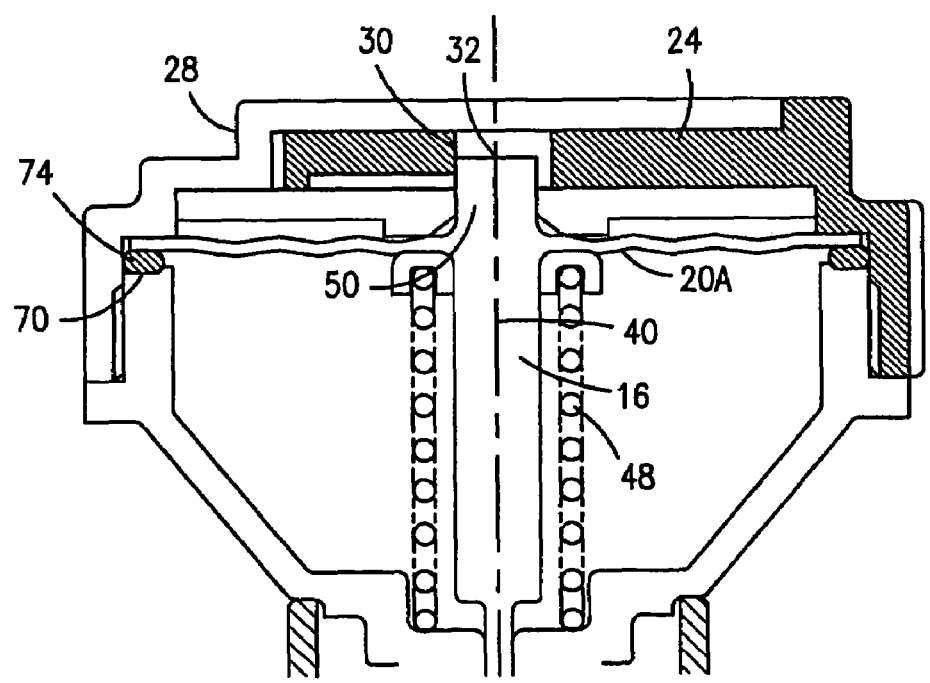

In one embodiment, the fluid diaphragm 20B is an integral part of the pressure communicator 16A. For example, as shown in FIG. 4, the fluid diaphragm 20B is formed of the same material as the pressure communicator 16A and is preferably formed out of plastic or metal. In a one-piece configuration, the diaphragm 20B has a substantially planar form which extends radially away from an axial center line 40 of the pressure communicator 16A. In another embodiment, illustratively shown in FIGS. 9 and 10, a fluid diaphragm 20A has a cross-section with alternating ridges and troughs. These alternating ridges and troughs, in some cases, function to define the flexure of the fluid diaphragm 20A during operation. The fluid diaphragm 20A and 20B in the one-piece configuration may exhibit differing degrees of flexibility due to characteristics and/or proportions of its composite material. For example, the thickness of the material can be varied, or the material can be suitably treated to enhance or suppress the rigidity of the material to provide the selected pre-established flexure characteristics. The selected characteristics allow the diaphragm to be tuned at a desired damping rate to dampen out certain pressure spikes for pre-defined transient time intervals.

The non-fluid system portion 22 of the housing 12 contains a projectable indicator 24. This projectable indicator 24 is selectively moveable such that a portion or portions of the indicator 24 can project through an opening or openings 26 in a cap 28 of the housing 12. The projectable portion or portions extend past the exterior surface of the housing 12 as shown in, for example, FIG. 2. The projectable portion, when projected, changes the overall configuration of the filter change indicator 10. For instance, the projectable indicator 24 in one position is entirely housed within the housing 12. Thus, no significant portion of the projectable indicator 24 extends outside of the housing 12. The indicator 24 moves into a second projected position either in a single step or through incremental steps. In the projected position, a portion of the indicator 24 protrudes exteriorly from the housing 12. This protrusion changes the shape of the exterior of the housing 12. In one form, the indicator moves in a lateral direction relative to the axial center line 40 of the filter change indicator.

In one embodiment, the indicator 24 has a portion, which is contained within the housing 12, and a portion that is extended from the housing through, for example, openings 26. When actuated by a higher than normal pressure differential, the contained portion and extended portion of the indicator 24 are simultaneously moved into and out of the housing cap openings 26. For example, one portion may be colored green and the other portion may be colored red. This color-coding provides a visual indication as to the filter status in addition to the exterior tactile-shape change.

The indicator 24 has an engagement surface 30, which mechanically engages an actuator portion 32 of the pressure communicator 16. The pressure communicator 16 in operation moves due to pressure generated in the fluid system. The engagement between the actuator 32 and the indicator 24 is altered by movement of the pressure communicator 16. The altered engagement allows the indicator 24 to be moved in, for example, a lateral direction which is assisted by a first tensioning spring 34, which exerts a constant biasing pressure on the indicator 24 in a substantially unidirectional fashion.

Figure 8A:
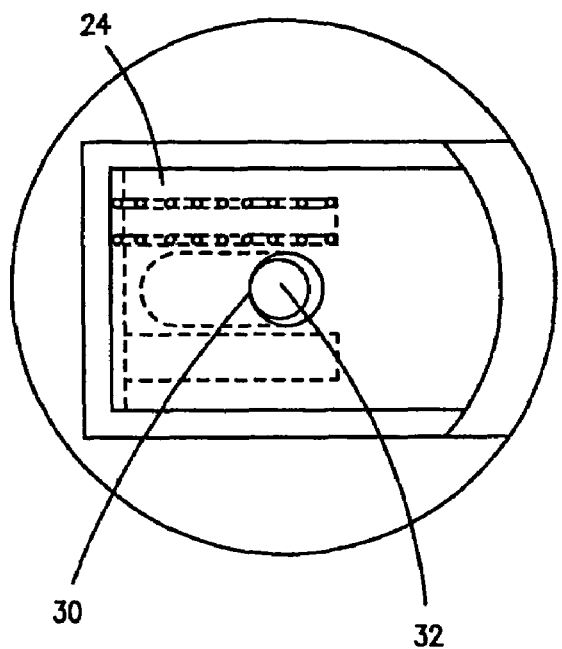
FIGS. 8A and 8B are a top plan view, partially in phantom, and a cut away view respectively of a filter change indicator.
Figure 8B:
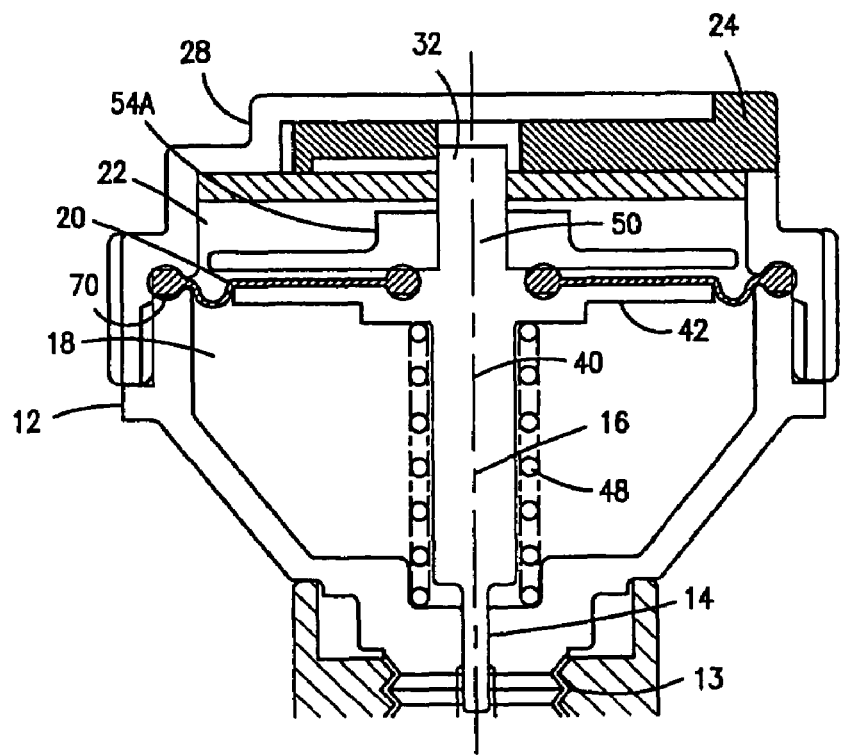

In one embodiment, the pressure communicator 16 may have a first end 36 and a second end 38 with an axial centerline 40 extending between these ends. The pressure communicator can be configured to include differing cross-sectional portions intermediate the first end 36 and the second end 38, as illustratively shown in FIG. 8. The pressure communicator 16 is displaceable along the axial center line 40. A web portion 42 extends radially relative to the axial center line 40 and supports and interacts with the fluid diaphragm 20 in order to maintain the sealing integrity of the diaphragm 20. The web portion 42 may also act to modulate the flexibility of the fluid diaphragm 20 such that portions of the diaphragm 20 are not deformed with similar flexibility characteristics. The web portion 42 of the pressure communicator 16 may extend out toward an interior wall of the housing 12 equidistantly such that a gap 56 exists between an edge 58 of the web portion 42 and an interior wall or surface of the housing 12. In one embodiment, as illustratively shown in FIG. 10, a first portion 43 of the pressure communicator 16C is associated with a second portion 147 of the pressure communicator. The second portion 147 of the pressure communicator is formed integral with the fluid diaphragm 20C.

Figure 2:
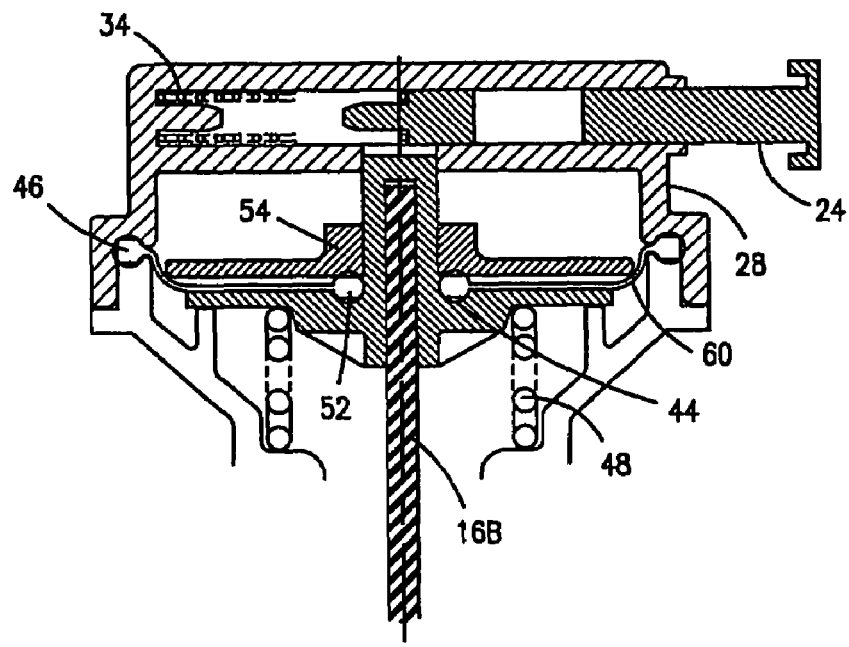
FIG. 2 is a cut-away view of the filter change indicator in a position with the projectable indicator extended.
Figure 3:
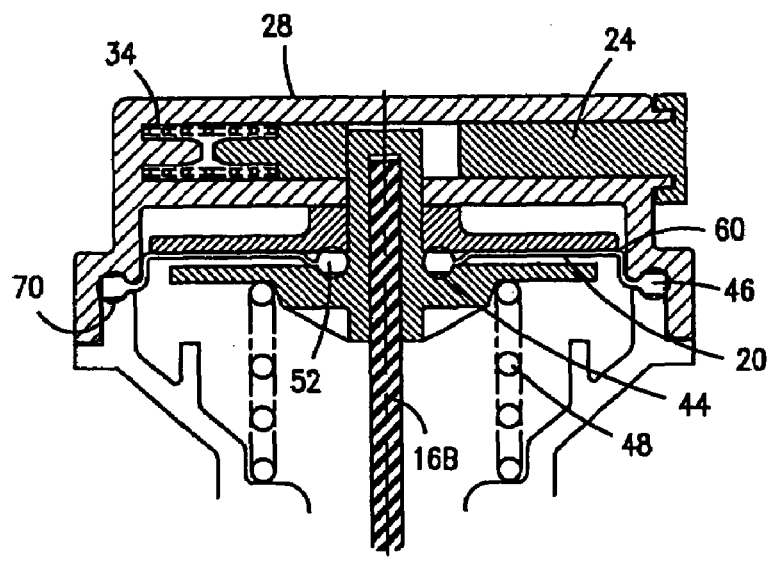
FIG. 3 is a view of the filter change indicator of FIG. 2 in a non-extended position.

The pressure communicator 16, as illustratively shown in FIGS. 2 and 3, may also have an engagement surface 44, such as an arcuate slot, which interacts with an inner lip portion 52 of the fluid diaphragm 20. The inner lip portion 52 ensures that fluid cannot pass between the fluid diaphragm 20 and the engagement surface 44 under normal circumstances. The fluid diaphragm 20 may also have a housing sealing lip 46. With the fluid diaphragm 20 in place, the interior of the housing is divided by the fluid diaphragm 20 into a fluid portion 18 and a non-fluid portion 22. A portion of the pressure communicator 16 extends through the diaphragm 20 such that the pressure communicator 16 is present in both fluid 18 and non-fluid 22 portions of the housing 12 as shown in at least FIG. 1. The portion of the pressure communicator 16 extending into the non-fluid portion 22 of the housing may have cylindrical protrusion 50, wherein a portion of the cylindrical protrusion includes the actuator 32. A sealing washer 54 is provided over the protrusion 50 such that it can be screwed or pressed into place to create or aid in creating a fluid and/or pressure tight seal between the fluid diaphragm 20 and pressure communicator 16. For example, the sealing washer contacts the inner lip portion 42 such that the inner lip portion is held in firm contact with the pressure communicator 16. The sealing washer 54A can extend away from the axial centerline 40 toward the interior surface of the housing 12. The sealing washer 54A, in some cases, may extend radially a distance which is substantially less than, co-extensive with, or greater than the distance the web portion 42 extends radially.

The pressure communicator 16, in one embodiment, interacts with a second spring 48 or pressure communicator spring which biases the pressure communicator 16 in a unidirectional fashion such that engagement portion 32 is maintained in a stable position relative to the engagement surface 30 of the pressure indicator 24 during normal pressure ranges in the fluid system. The pressure communicator spring 48 is mounted in association with a tubular portion 100 of the housing. The tubular portion may define part of the fluid pathway between the fluid portion 18 and the fluid system.

The fluid diaphragm 20 is associated with the pressure communicator 16 and may be disk-shaped with a diameter greater than that of a pressure communicator web 42. The fluid diaphragm 20 extends beyond the interior surface plane of the housing 12. The portion extending beyond the interior surface plane of the housing includes a housing sealing lip 46 which fits into an arcuate slot 47 formed in the housing wall or it may interact with a similar structure in the housing 12. The housing sealing lip 46 is fluidly secured through use of the cap 28, which may be pressed or screwed down against the housing sealing lip 46 of the fluid diaphragm 20. The fluid diaphragm 20 has a flexible portion 60, which spans the gap 56 between the end 58 of the web and the interior wall of the housing. This can, among other things, allow for displacement of the pressure communicator 16 while still maintaining the fluidly separated environment within the housing.

Figure 10A:
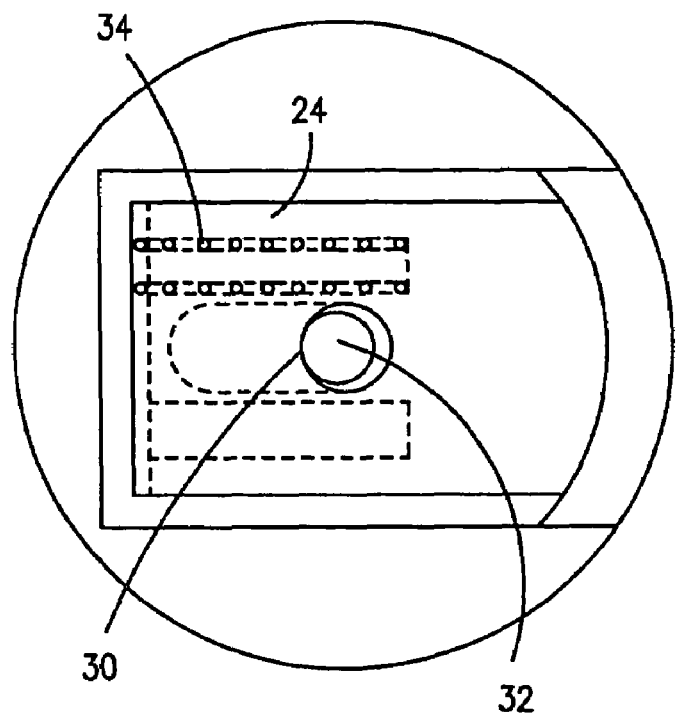
FIGS. 10A and 10B are a top plan view, partially in phantom, and a cut away view respectively of a filter change indicator.
Figure 10B:
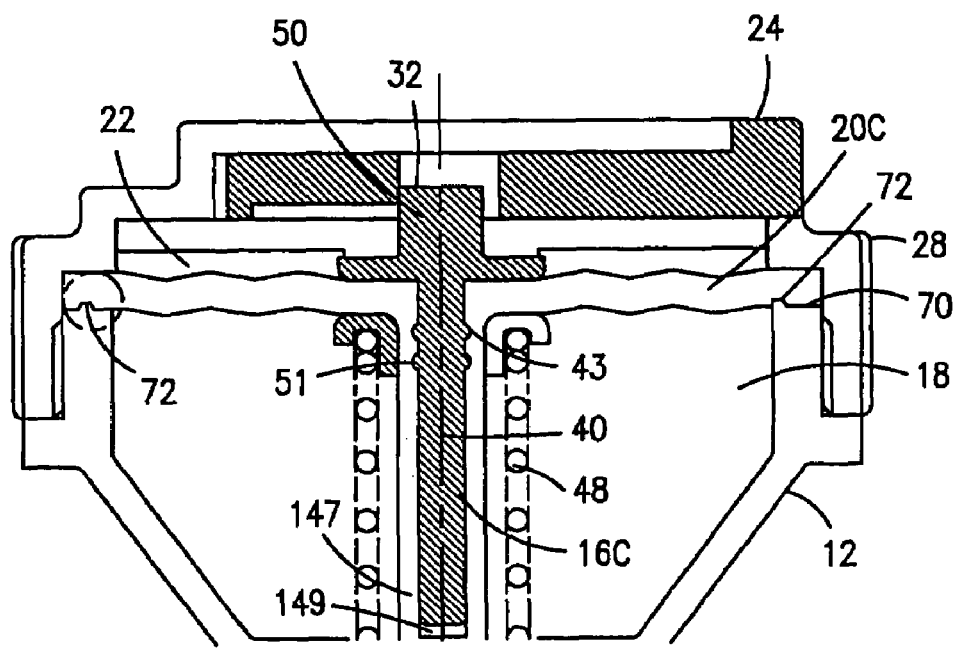
Figure 11:
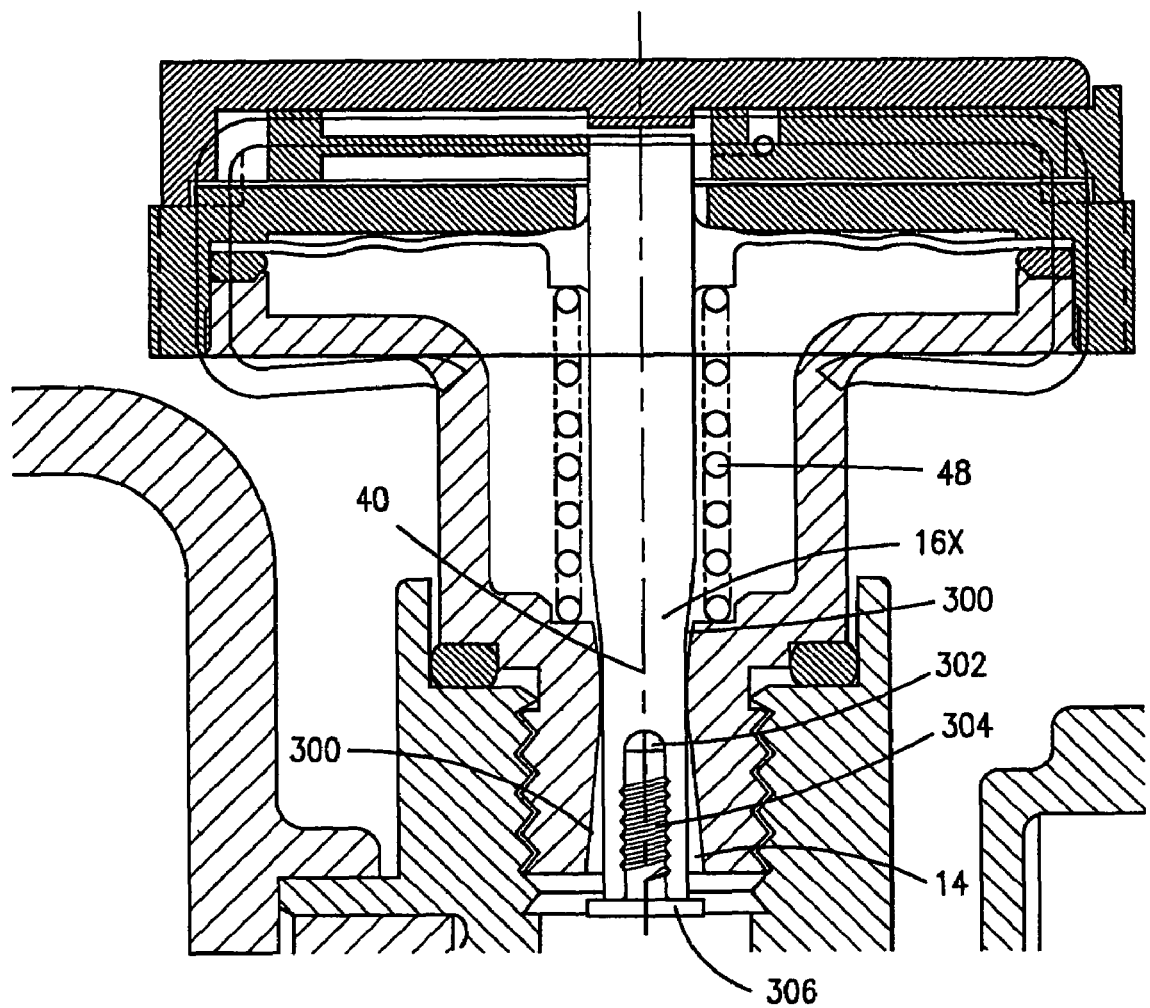
FIG. 11 is a cut-away view of a filter change indicator having a crash safety feature.
Figure 12A:
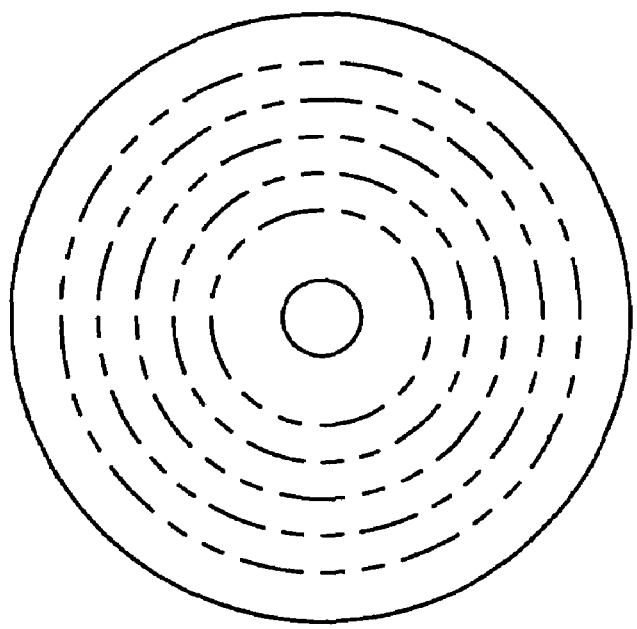
FIGS. 12A and 12B are a top view of a force communicator and a side view of a force communicator.
Figure 12B:
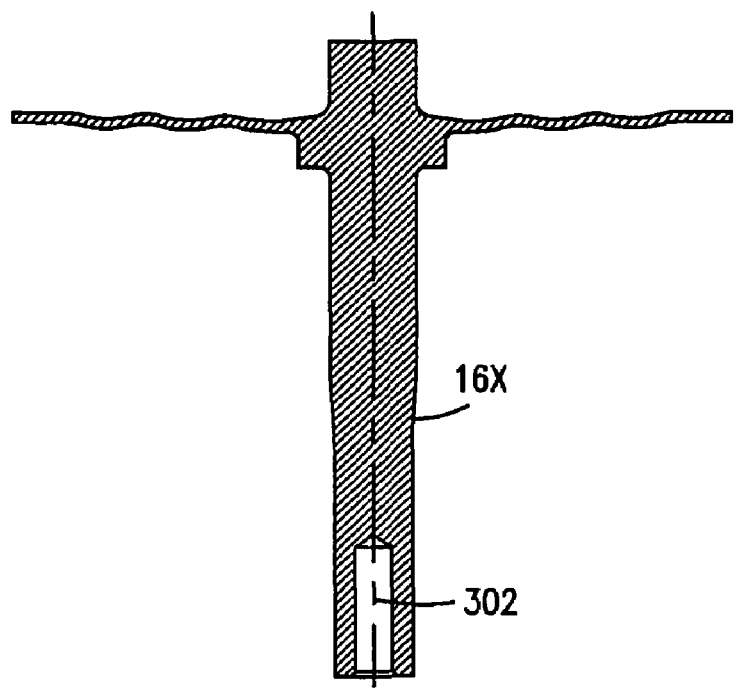

In one embodiment, the housing has a shelf 70 upon which a portion of the fluid diaphragm 20, the housing sealing lip 46, and/or an O-ring 74 rests. The shelf 70 may have vertical sealing ridges 72, which interact with the resting element, for instance, when the cap 28 is associated with the housing 12. FIG. 10 illustratively shows two variants of the sealing ridges 71.

Figure 6:
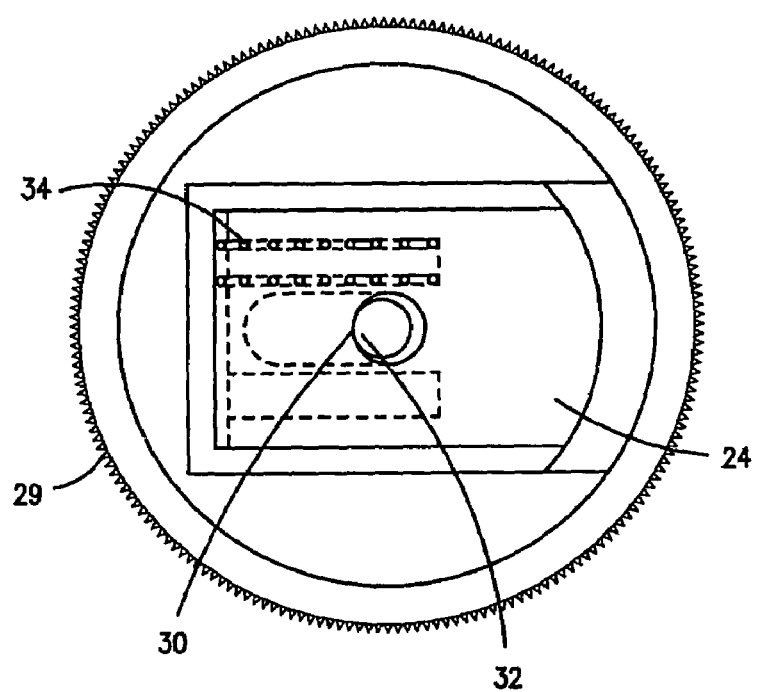
FIG. 6 is a top plan view, partially in phantom, of a filter change indicator.
Figure 5:
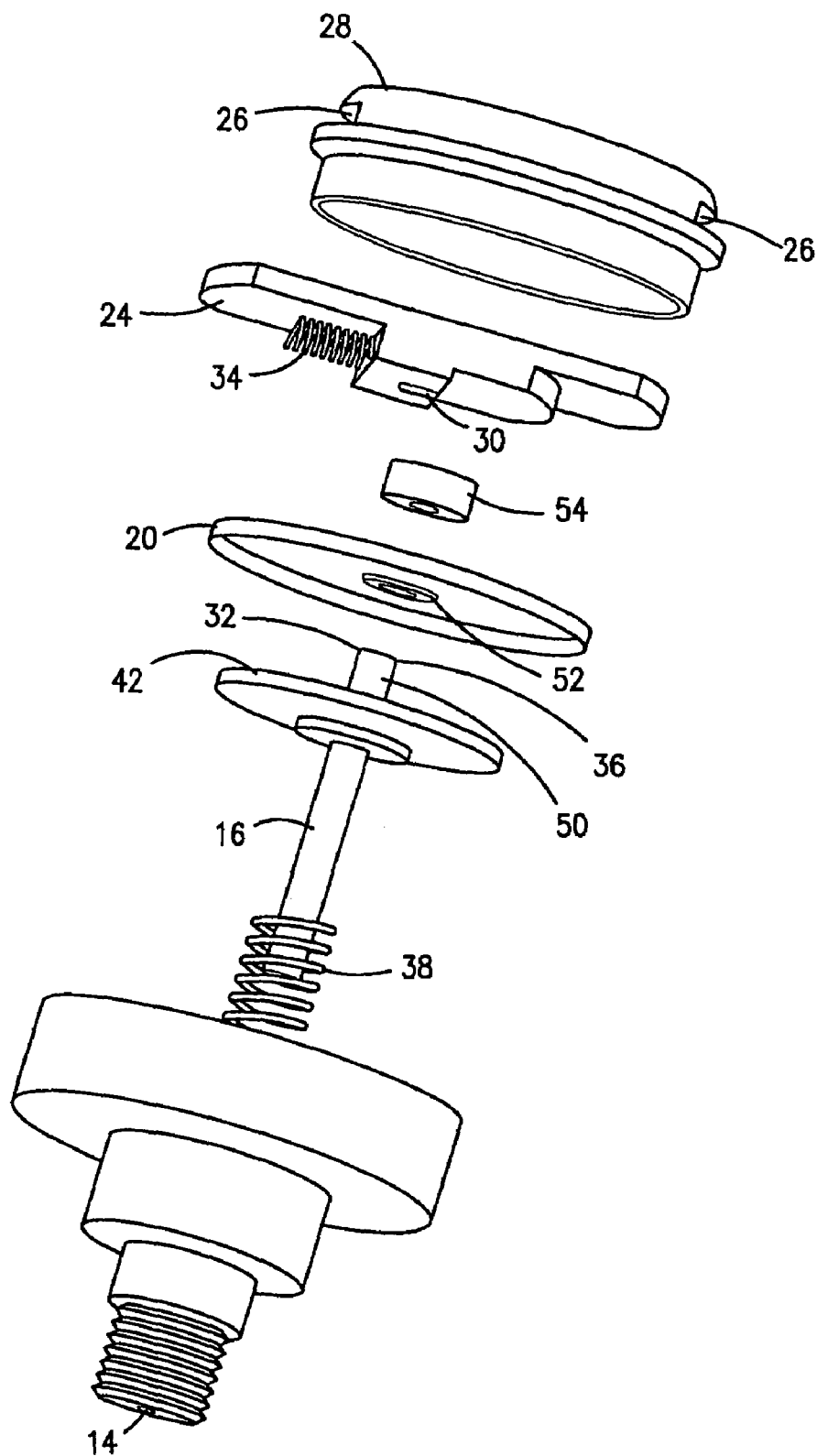
FIG. 5 is an exploded view of the filter change indicator showing various elements of the filter change indicator.
Figure 7:
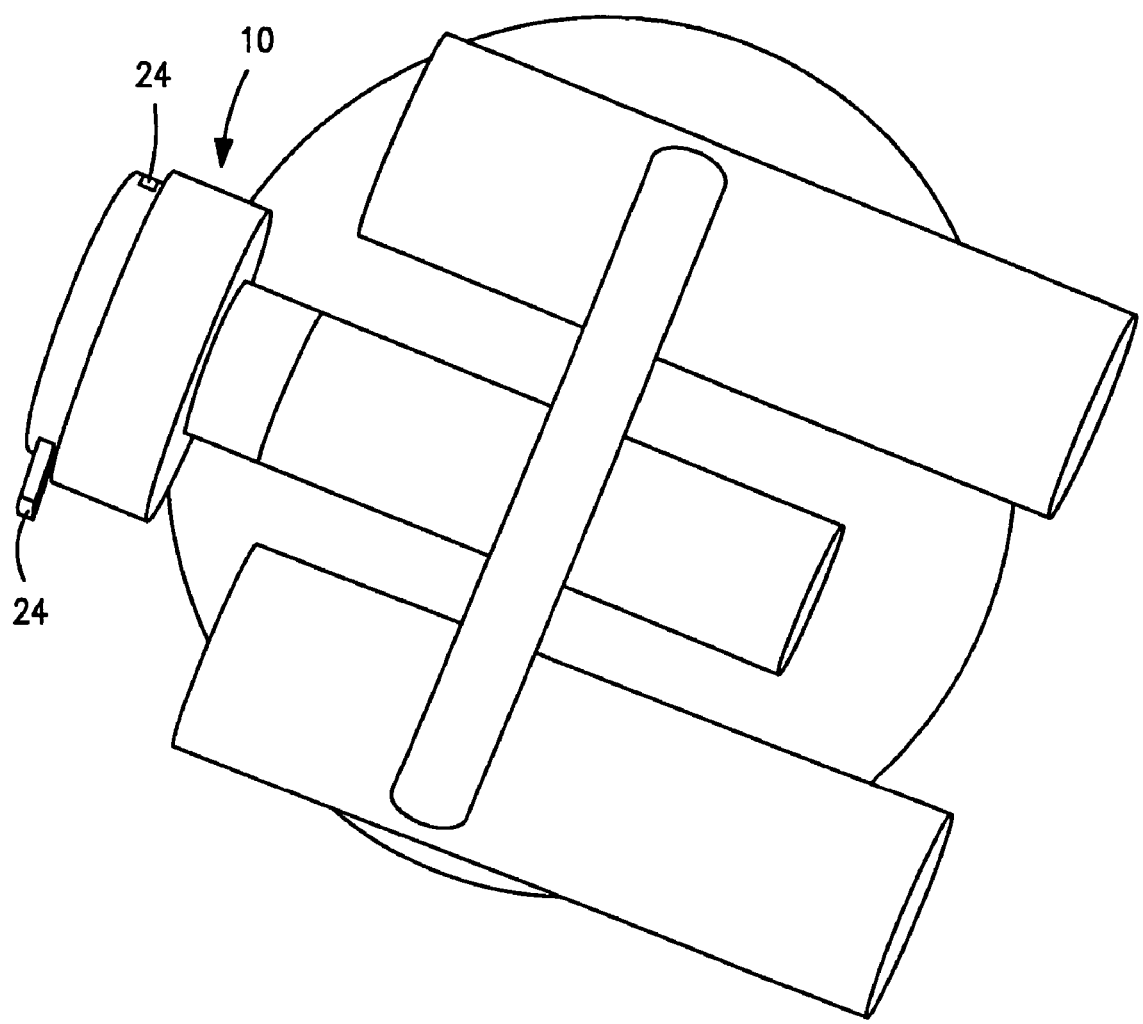
FIG. 7 is a bottom plan view of a filter housing from the end with an associated filter change indicator.
Figure 13C:
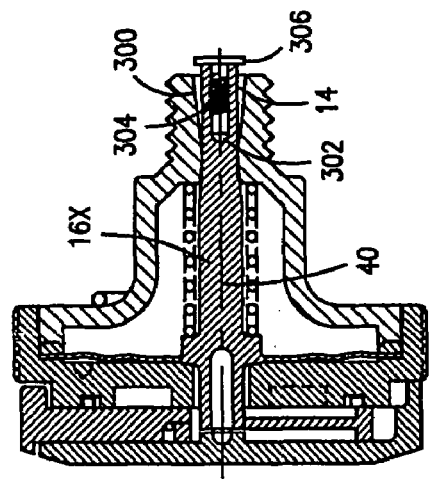
FIG. 13C is a cut away view of a filter change indicator as shown in FIGS. 13A and 13B.
Figure 13B:
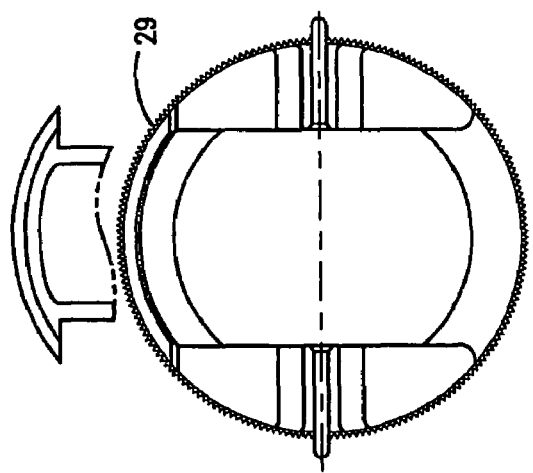
FIGS. 13A and 13B are a side plan view and a top plan view respectively of a filter change.
Figure 13A:
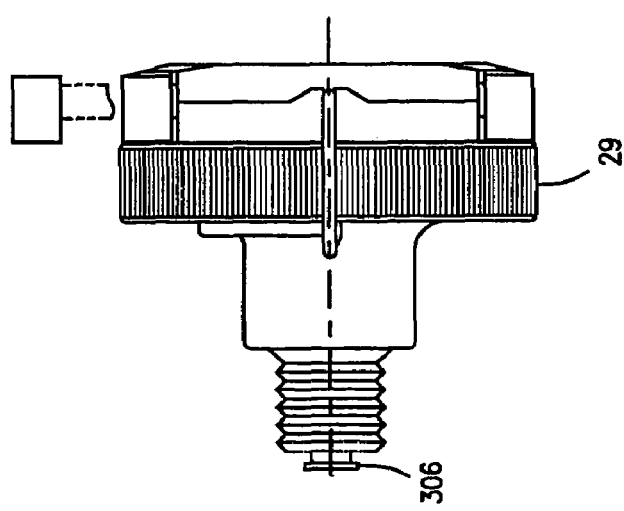

When connected to a fluid system, a portion 102 of the pressure communicator 16 extends into the fluid pathway 14. This can allow for such things as a modulation of the fluid flow rate between the fluid portion 18 and the fluid system. In some cases, it is necessary to ensure that the fluid portion 18 of the housing 12 is fully flooded with the fluid from the fluid system. The exterior of the housing 12 may, as shown in FIGS. 6, 13A, and 13B, have a knurled portion 29 to facilitate removal to vent air from the fluid system. In this regard, the filter change indicator functions as an effective air vent as well as a change indicator.

During operation, for instance, when the fluid system is pressurized, the fluid system pump is moving fluid through the filter. A differential pressure is created across the filtration membrane or other filtering structure. This differential pressure typically is of a nature that a lower pressure exists on the filtrate side of the filter. The fluid diaphragm 20 and associated pressure communicator 16 of the filter change indicator 10 are subjected to a differential pressure proportionally relative to this pressure differential across the filter. As the filter becomes occluded, and the differential of pressure across the filter changes due to a restriction of fluid flow through the filter, the pressure communicator 16 is forced against the second spring 48. As the filter occlusion increases over time due to an increased accumulation of material filtered out of the fluid, the actuator portion 32 disengages from the engagement surface 30 of the indicator 24, thus allowing the indicator 24 to be forced by the first spring 34 into a second or subsequent position. For instance, the engagement surface 30 of the indicator may have a step-like configuration as shown in, at least, FIG. 1. This step-like configuration is designed so as to allow the actuator portion 32 to retreat away from the indicator engagement surface 30 incrementally.

In operation, the height of each step of the engagement surface 30 and the lateral displacement distance of the indicator 24 can be correlated with different filter occlusion levels. The step-like configuration allows for an identification of differing degrees of filter occlusion as increased pressure is exerted upon the pressure communicator and fluid diaphragm. In operation, for example, the pressure communicator 16 is pulled downward against the biasing pressure of the second spring 48. The indicator 24 is then allowed to move incrementally laterally along the subsequent step-like engagement surface 30 as the pressure communicator 16 descends.

In addition, during operation in, for instance, low temperature environments a transient increase in the pressure differential may occur. For instance, in extremely cold weather, fluid may thicken, gel, or may contain solidified waxes or other non-fluid components. These temperature-related changes create transient higher pressure differentials across the filter along with a higher pressure differential between the fluid portion 18 and non-fluid portion 22 of the filter change indicator housing 12. Often these higher than expected differentials last for only a short time duration and dissipate when fluid warmed by, for example, engine heat, and/or a fluid heater reaches the filter element. Once warmed up, the thickening, wax formations, and/or gelling dissipate and the pressure differential drops to within a normal range.

In one embodiment, these transient higher differential pressures are moderated or otherwise compensated for with a delay in the filter change indicator actuation. The delay can be anywhere from about 0.25 seconds to about 5.0 seconds but preferably between about 1 to 2 seconds. This delay may be accomplished by, for example, the flexible portion 60 of the fluid diaphragm 20 which spans the gap 56 between the end 58 of web portion 42 of the pressure communicator 16 and an interior structure or surface of the containment vessel 12. This flexible portion 60 allows for a certain amount of buffering of the higher short term pressure differentials. For example, in a system that has a fluid heater in addition to a filter and pump, the fluid heater may warm the fluid such that the viscosity and/or other properties are kept within normal operational ranges. However, often a small volume of the fluid may not have been warmed due to the distance from the heater. This non-warmed fluid may then be caused to pass through the filter by the pump. Compensation or buffering of the higher differential pressure can occur through the pre-established flexure resistance of the flexible portion 60 of the fluid diaphragm 20 which, due to its elasticity, creates a lag in the transmission of pressure to the pressure communicator 16. Thus, the pressure communicator 16 does not move within the short time duration that it takes warmer fuel to reach the filter element. This lag time can prevent misleading actuation of the filter change indicator.

In one embodiment, the lag in response can be effectuated through use of dimensioning of certain elements to produce a combination of surface areas and/or mass that will move with a delayed fashion in response to transient high pressure differentials. For instance, the mass of components and/or spring tension profiles may be designed to resist sudden movement. In addition, the fluid passages leading from the fluid passage may be dimensioned such that the internal structures of the filter change indicator are not subjected to sudden pressure changes due to fluid transfer limitations.

In one embodiment, a fluid change indicator, which has changed shape through protrusion of a portion of the indicator 24, is reset by pressing, for example, with a finger on the exterior of the extended portion of the indicator 24 in a direction toward the housing 12. This pressing moves the indicator 24 in a direction counter to the first spring 34 and back into the housing 12. Since the pressure communicator is under continuous biasing pressure by the second spring 48, the actuator portion 32 re-engages with the engagement portion 30 of the indicator. For example, in operation a mechanic can push the extended portion of the indicator 24 back into the housing 12, resetting the indicator portion, and then operate the fluid system to monitor and determine whether or not the indicator is again actuated.

Mechanically, in one embodiment, the pressure generated by the second spring 48 is designed to be greater than the pressure exerted on the pressure communicator 16 during normal fluid system operation. As an example, the second spring 48 has a biasing pressure, which keeps the actuator portion 32 engaged with the indicator engagement portion 30 at all pressure differentials below a predetermined filter occlusion level. The differential pressure across the filter can be determined for different filter occlusion states and can be correlated to differential pressures developed in the housing 12. A filter with, for instance, a 75% occlusion can be correlated with a certain pressure differential across the fluid portion 18 and the non-fluid portion 22 of the filter change indictor 10. This correlated pressure is then used for selection of an appropriate biasing device such as the second spring 48. Also factored into this equation, among other things, can be the force of the engagement surface 30 against the actuator 32 generated by the first spring 34. Thus, a frictional force may be present between the actuator portion 32 and the indicator engagement surface 30 such that second spring 48 does not require the total biasing force of the correlated pressure due to the occlusion level.

In one embodiment a crash safety feature is present. The crash safety feature operates to prohibit or retard fuel flow through the filter change indicator 10 in the event the filter change indicator is damaged by, among other things, an impact event. For example, a filter change indicator present on a vehicle may be damaged in the event of the vehicle crashing. Such damage may result from, for example, a crushing and/or a shearing force being applied to the filter change indicator 10. This force may cause structural failure of one or many portions of the filter change indicator. The structural failure of the one or many portions can result in a fluid containment breach. The fluid escaping from the filter change indicator if flammable or corrosive may pose a serious safety hazard.

The crash safety feature may include a pressure communicator 16x having a tapering configuration along portions of its axial length. This tapering configuration is configured to cooperatively associate with a tapered bore 300 during, for example, application of a crushing force. The tapered bore 300 forms a portion of the fluid passage 14. In the event of a crushing force being applied to the filter change indicator, the tapered portion of the pressure communicator 16x is driven into cooperative association with the tapered bore 300. This cooperative association may seal off, or otherwise inhibit fluid flow through the fluid passage 14. The pressure communicator 16x may also have a connecting surface such as a threaded portion, dimensioned portion, and/or a cavity 302. For example, the cavity 302 may be configured to receive a screw 304 having a head 306.

In one embodiment the pressure communicator 16x may be formed of a material that will operate to bend out of axis in response to, for example, a shearing force being applied to the filter change indicator 10. In the event a shearing force is applied to the filter change indicator a portion of the pressure communicator 16x may bend and a portion of the pressure communicator may be pulled through the tapered bore 300. As the portion of the force communication is pulled through the tapered bore 300, the screw head 306 is forced into association with the tapered bore 300. It should be understood that the second end 39 of the pressure communicator 16x may have various configurations, and may be associated with a variety of shaped elements which serve to associate with the tapered bore 300.

Figure 14:
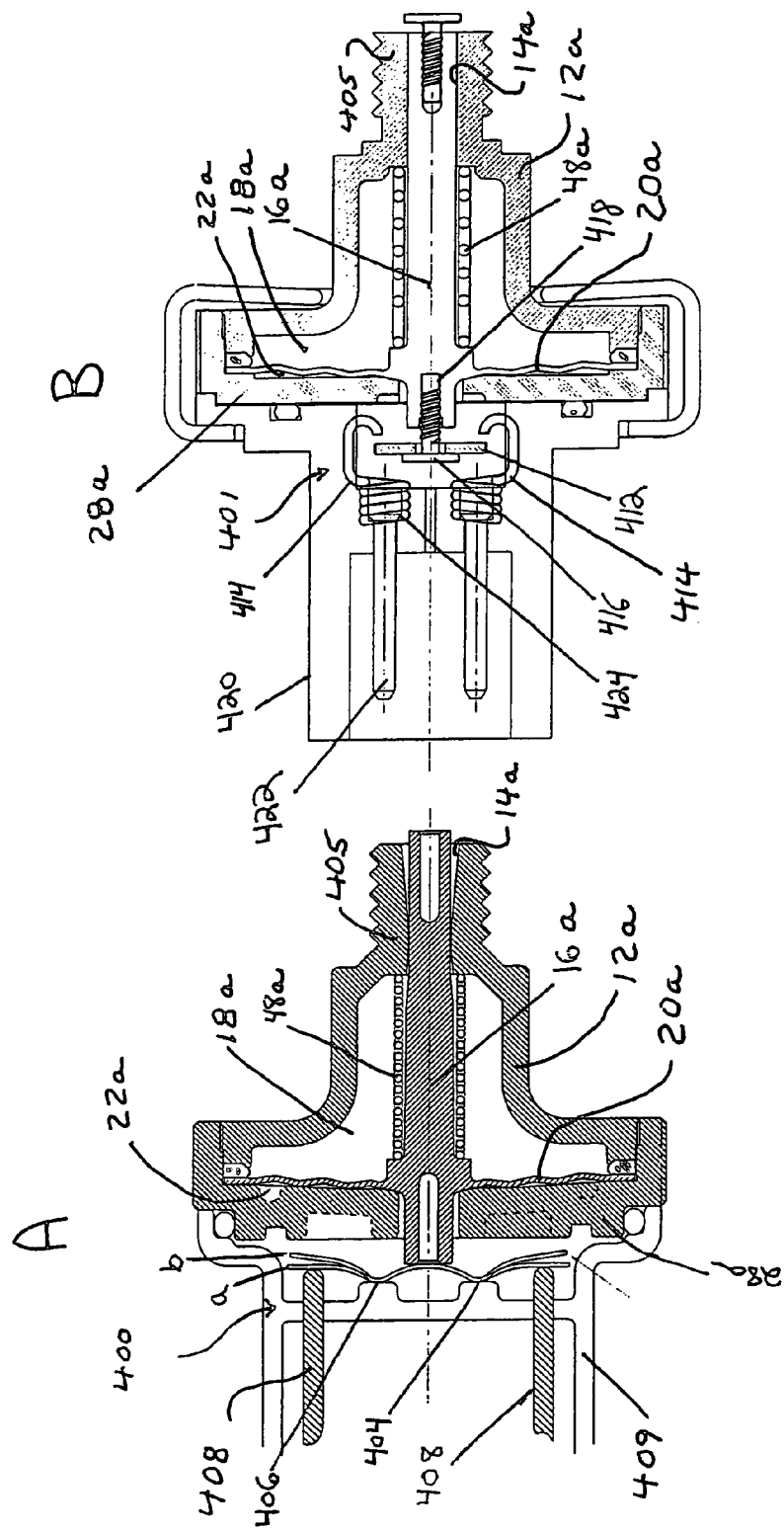
FIGS. 14A and 14B are cut away views of filter change indicators each having a different embodiment of a normally open style electrical contact assembly.
Figure 15:
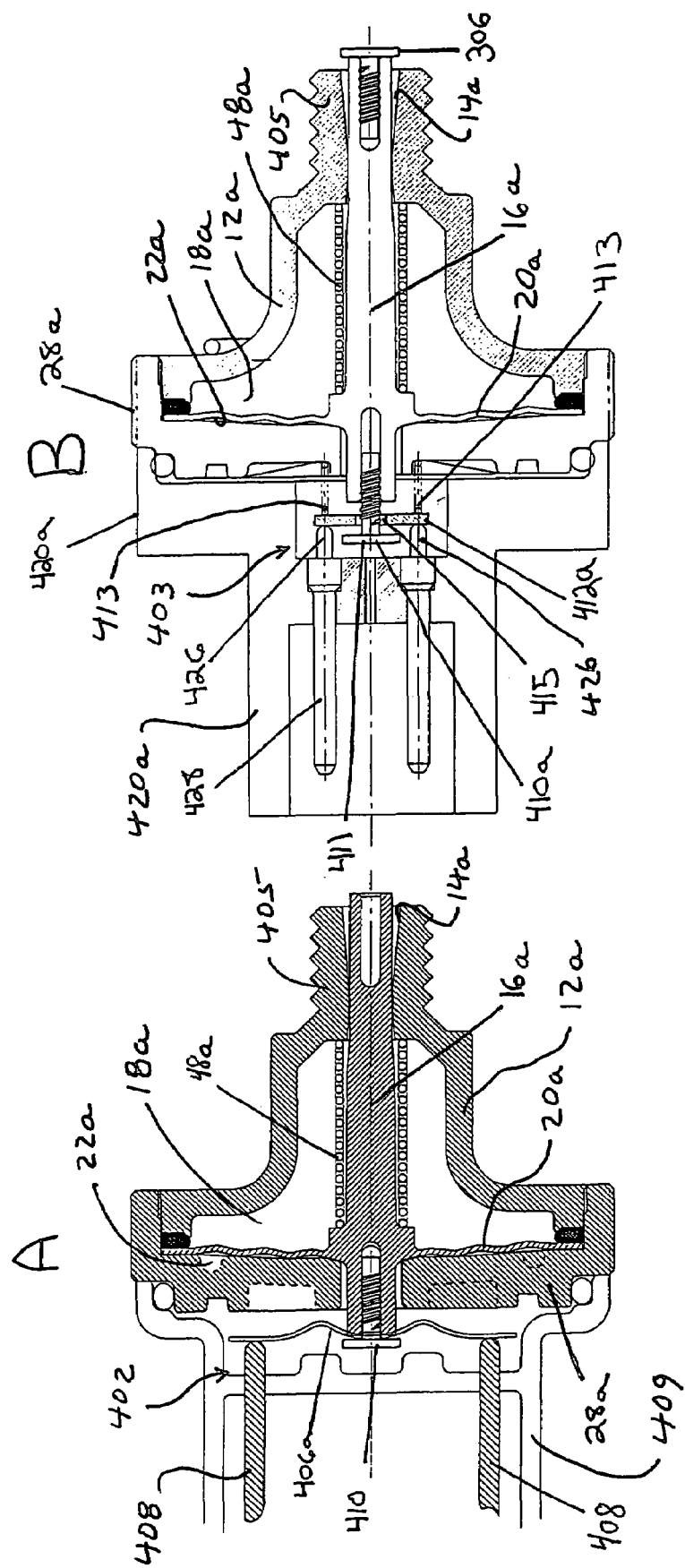
FIGS. 15A and 15B are cut away views of filter change indicators each having a different embodiment of a normally closed style electrical contact assembly.

In another embodiment, an electrical contact unit is employed for the purpose of indication. It should be understood that any of the above components may be used either alone or in combination with the below-described electrical contact unit. The electrical contact unit can be of a normally open or normally closed circuit type. A normally open circuit type electrical contact is configured to operate with an electrical indicator circuit that is designed to be incomplete. A normally open circuit system requires that the circuit be closed in order to allow a signal to be generated. In contrast, a normally closed circuit type electrical contact is configured to operate with an electrical indicator circuit that is designed to be complete. A normally closed circuit system requires that the circuit be opened in order to allow a signal to be generated. With reference to FIGS. 14A and 14B, a filter change indicator may include a normally open type electrical contact having, for example, a pre-stressed contact unit 400 (FIG. 14a), or a prong contact unit 401 (FIG. 14B). With reference to FIGS. 15A and 15B, a filter change indicator may include a normally closed type electrical contact having, for example, a pre-stressed contact unit 402 (FIG. 15A), or a prong contact unit 403 (FIG. 15B).

The electrical contact units 400, 401, 402, 403 may be used with any of the components previously described. In this regard, the filter change indicators of FIGS. 14A, 14B, 15a and 15B may each include a housing 12a partially forming a containment vessel or fluid portion 18a. A fluid passage 14a extends into the fluid portion 18a from the exterior of the housing 12a. A pressure communicator 16a is positioned within the housing 12a as previously described. A fluid diaphragm 20a separates the fluid portion 18a of the housing from a non-fluid portion 22a. A spring 48a is provided in connection with the pressure communicator 16a to bias the pressure communicator in an unidirectional fashion as previously described. The housing 12a may include an externally threaded portion 405 as shown.

As shown in FIG. 14A, the pre-stressed normally open contact unit 400 utilizes an electrical actuator in the form of a pre-stressed metal plate 406. The pre-stressed metal plate 406 is flexible between an open position "b" and a closed position "a". The pre-stressed metal plate 406 is designed to remain in a natural closed position unless acted on by an external force. For example, an external force applied to the center of the pre-stressed metal plate 406 causes the plate 406 move into the open position "b". The pre-stressed metal plate 406 is supported by plate rests 404.

In the embodiment as shown in FIG. 14A, electrical contacts 408 protrude through a connector 409 attached to the cap 28a such that they may be selectively contacted by the pre-stressed metal plate 406 as shown. The electrical contacts 408 may be terminals that can be connected to a remainder of an electrical indicator circuit. A portion of the pre-stressed metal plate 406 is in contact with the pressure communicator 16a. The pre-stressed metal plate 406 may be fixed to the pressure communicator 16a by a fastener, such as a screw or rivet. The pressure communicator 16a exerts a force against the pre-stressed metal plate 406 by transmission of the force from spring 48, thus keeping the pre-stressed metal plate 406 in a normally open position. In operation, as the pressure communicator 16a descends, due to filter occlusion, as previously discussed, the pre-stressed metal plate 406 is allowed to move to its natural closed position "a", and thus make contact with electrical contacts 408 and closing the circuit.

As shown in FIG. 15A, the pre-stressed normally closed contact unit 402 utilizes a pre-stressed metal plate 406a. The pre-stressed metal plate 406a may be fixed to the pressure communicator 16a by a fastener 410. The fastener 410 may be, for example, a screw or rivet. Electrical contacts 408 protrude through a connector 409 attached to the cap 28a such that they may be selectively contacted by the pre-stressed metal plate 406a. The pressure communicator 16a is biased by the spring 48a such that the pre-stressed metal plate 406a is held against the contacts 408, thus closing the circuit. In operation, as the pressure communicator descends, as previously discussed, the pre-stressed metal plate 406 is moved away from contacts 408, thus opening the circuit. The pre-stressed metal plate 406a may also, in one embodiment, be pulled against plate rests (not shown) which are similar to those shown in FIG. 14A. When present, the plate rests act as a fulcrum, wherein the force of the descending pressure communicator 16y cause the pre-stressed metal plate 406 to flex between a closed and an open position.

With reference to FIG. 14B, in this embodiment an electrical signal is initiated by completion of an electrical circuit across two C-shaped probes 414. The contact across the probes 414 is through a conductor attached to the pressure communicator 16a. For example, the conductor may be a conductive disk 412 mounted on the pressure communicator 16a by a fastener 416. The disk 412 extends into the opening of the C-shaped probes 414 as shown. The probes 414 may have a spring section 424 which, among other things, serves to cushion contact between the conductive disk 412 and the probes 414. The probes 414 may be attached to electrodes 422 that are embedded in, or otherwise affixed to, a coupling 420. The coupling 420 may be connected to an electrical component (not shown) that provides electrical connection between electrodes 422 and a remainder of the electrical indicator circuit. The coupling 420 may be mounted to the cap 28a of the filter change indicator. In operation, the disk 412 is maintained in its normal position spaced from the probes 414 by the pressure communicator 16a. As the pressure communicator 16a descends, the conductive disk 412 is brought into electrical contact with the probes 414, thereby closing the circuit.

With reference to FIG. 15B, in another embodiment an electrical signal is initiated by opening an electrical circuit across two probes 426. The contact across the probes 426 is through a conductor. For example, the conductor may be a conductive disk 412a that is held against the probes 426 by a conductor disk spring 413. The conductive disk 412a may have a central hole 415 through which a fastener 410a passes. The fastener 410a is fixed to the pressure communicator 16a, for example by threading, and has a head 411 that has a larger diameter than the central hole 415. The probes 426 may contact an upper surface of the conductive disk 412. The probes 426 may be attached to electrodes 428 that are embedded in, or otherwise affixed to, a coupling 420a. The coupling 420a is mounted to the cap 28a of the filter change indicator. In operation, as the pressure communicator 16a descends, the fastener 410a passes through central hole 415 until the fastener head 411 contacts the conductive disk 412a. As the pressure communicator 16a continues to descend, the conductor disk 412a descends with the pressure communicator 16a and loses contact with the probes 426, thereby opening the circuit.

While preferred embodiments have been shown and described, various modifications and substitutes may be made thereto. Accordingly, it is to be understood that the present embodiments have been described by way of illustration and not limitation.

The invention claimed is:

1. A fluid system pressure indicator comprising:
a housing comprising a containment vessel having an interior and a fluid communication passage providing a first fluid path between a portion of the containment vessel interior and an exterior of the containment vessel;
a pressure communicator located within the housing, said pressure communicator having a fluid contact portion and an electrical circuit actuator;
an electrical contact associated with said actuator;
a fluid diaphragm sealingly engaged with the housing and the pressure communicator such that the fluid contact portion of the pressure communicator is fluidly separated from the actuator;
a pressure communicator spring that exerts a continuous unidirectional pressure on the pressure communicator;
an electrical indicator having a first circuit terminal and a second circuit terminal, said first and second circuit terminals being selectively connected electrically by said electrical contact associated with the electrical circuit actuator.

2. The fluid system pressure indicator of claim 1, wherein the electrical indicator is part an open type indicator circuit.

3. The fluid system pressure indicator of claim 2, wherein the electrical contact is a pre-stressed plate which is movable between a first configuration and a second configuration, said pre-stressed plate electrically connecting said first and second circuit terminals when in the second configuration, and being electrically disconnected from said first and second terminals in said first configuration.

4. The fluid system of claim 3, wherein said pre-stressed plate is flexed into its second configuration upon descending movement of said fluid pressure communicator to close said circuit.

5. The fluid system of claim 4, wherein said pressure communicator engages said pre-stressed plate to maintain it in its first configuration.

6. The fluid system pressure indicator of claim 2, wherein the electrical contact is a disk movable between a first position and a second position, said disk electrically connecting the first and second circuit terminals when in the second position.

7. The fluid pressure indicator of claim 6, wherein said disk is connected to said pressure communicator and is moved into its second position upon descending movement of said pressure communicator.

8. The fluid pressure indicator of claim 7 wherein said first and second terminals each include a C-shaped terminal portion, said disk extending into said opening in said C-shaped portions.

9. The fluid system pressure indicator of claim 1, wherein the electrical indicator is part a closed type indicator circuit.

10. The fluid system pressure indicator of claim 9, wherein the electrical contact is a pre-stressed plate which is movable between a first configuration and a second configuration, said pre-stressed plate being electrically connected to said first and second circuit terminals when in the said first configuration, and electrically disconnected from said first and second circuit terminals when in said second configuration.

11. The fluid system of claim 10, wherein said pre-stressed plate is moved into its second configuration upon descending movement of said fluid pressure communicator to open said circuit.

12. The fluid system of claim 11 wherein said pre-stressed plate is attached to said pressure communicator.

13. The fluid system pressure indicator of claim 9, wherein the electrical contact is a disk movable between a first position and a second position, said disk electrically connecting said first and second circuit terminals when in the said first position, and being electrically disconnected from said first and second circuit terminals when in said second position.

14. The fluid system pressure indicator of claim 13, wherein said disk is urged into in electrical contact with the first and second circuit terminals by a spring and includes a central orifice through which a portion of a fastener extends, said fastener being attached to said fluid communicator and including a head having a diameter larger than the central orifice, said electrical contact being engagable by said fastener head upon descending movement of said pressure communicator to move said disk into its second position to open said circuit.

15. The fluid system pressure indicator of claim 1, wherein the pressure communicator and the fluid diaphragm are formed as a unitary piece.

16. The fluid system pressure indicator of claim 1, wherein the unidirectional pressure exerted on the pressure communicator by the pressure communicator spring is less than a sum of a mechanical pressure exerted on the pressure communicator and a fluid pressure correlated to a filter obstruction level.

17. The fluid system pressure indicator of claim 16, wherein the fluid pressure correlated to a filter obstruction level is an average pressure per a unit of time.

18. The fluid system pressure indicator of claim 17, wherein the unit of time is a range of about 0.25 to about 5 seconds.

19. The fluid system pressure indicator of claim 1, further comprising an impact safety feature wherein the fluid communication passage has a tapered portion, and the pressure communicator has a dimensioned portion configured to operatively engage the tapered portion.

20. The fluid system pressure indicator of claim 19, wherein the pressure communicator includes a fastener connecting portion for accepting a fastener, and said dimensioned portion of the pressure communicator is a portion of the fastener.

* * * * *